United States Patent
Kawatani

(10) Patent No.: US 7,562,066 B2
(45) Date of Patent: Jul. 14, 2009

(54) METHOD OF VECTOR ANALYSIS FOR A DOCUMENT

(75) Inventor: Takahiko Kawatani, Kanagawa (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 545 days.

(21) Appl. No.: 10/380,264

(22) PCT Filed: Nov. 15, 2001

(86) PCT No.: PCT/US01/45599
§ 371 (c)(1), (2), (4) Date: Sep. 22, 2003

(87) PCT Pub. No.: WO02/41557
PCT Pub. Date: May 23, 2002

(65) Prior Publication Data
US 2004/0068396 A1 Apr. 8, 2004

(30) Foreign Application Priority Data
Nov. 20, 2000 (JP) .............................. 2000-353475

(51) Int. Cl.
G06F 17/10 (2006.01)
(52) U.S. Cl. ............................................. 707/2; 707/3
(58) Field of Classification Search .................... 704/1, 704/260; 707/5, 2, 3
See application file for complete search history.

(56) References Cited

U.S. PATENT DOCUMENTS

| | | | |
|---|---|---|---|
| 3,668,702 A * | 6/1972 | Jones | ........................ 342/91 |
| 5,301,109 A | 4/1994 | Landauer et al. | |
| 5,499,366 A | 3/1996 | Rosenberg et al. | |
| 5,619,709 A | 4/1997 | Caid et al. | |
| 5,634,021 A | 5/1997 | Rosenberg et al. | |
| 5,794,178 A * | 8/1998 | Caid et al. | ..................... 704/9 |
| 5,819,258 A | 10/1998 | Vaithyanathan et al. | |
| 5,857,179 A | 1/1999 | Vaithyanathan et al. | |
| 5,901,244 A | 5/1999 | Souma et al. | |

(Continued)

OTHER PUBLICATIONS

Oliveira et al., "Matrix-Based Algorithms for Document Clustering", p. 1-2, [online], Mar. 2005 [retrieved on Oct. 8, 2008]. Retrieved from the Internet:<URL: http://www.cerfacs.fr/algor/CSC05/Abstracts/27_oliveira.pdf>.*

(Continued)

Primary Examiner—John E Breene
Assistant Examiner—Dennis Myint

(57) ABSTRACT

The invention provides a document representation method and a document analysis method including extraction of important sentences from a given document and/or determination of similarity between two documents.

The inventive method detects terms that occur in the input document, segments the input document into document segments, each segment being an appropriately sized chunk and generates document segment vectors, each vector including as its element values according to occurrence frequencies of the terms occurring in the document segments. The method further calculates eigenvalues and eigenvectors of a square sum matrix in which a rank of the respective document segment vector is represented by R and selects from the eigenvectors a plural (L) of eigenvectors to be used for determining the importance. Then, the method calculates a weighted sum of the squared projections of the respective document segment vectors onto the respective selected eigenvectors and selects document segments having the significant importance based on the calculated weighted sum of the squared projections of the respective document segment vectors.

3 Claims, 7 Drawing Sheets

U.S. PATENT DOCUMENTS

| | | | | |
|---|---|---|---|---|
| 5,983,251 | A | * | 11/1999 | Martens et al. ............. 708/203 |
| 6,038,533 | A | * | 3/2000 | Buchsbaum et al. ........ 704/260 |
| 6,070,133 | A | | 5/2000 | Brewster et al. |
| 6,134,541 | A | * | 10/2000 | Castelli et al. ................. 707/2 |
| 6,347,315 | B1 | * | 2/2002 | Kiyoki et al. .................. 707/5 |
| 6,356,864 | B1 | * | 3/2002 | Foltz et al. ..................... 704/1 |
| 6,996,572 | B1 | * | 2/2006 | Chakrabarti et al. ........ 707/102 |

OTHER PUBLICATIONS

Bartell et al., "Latent Semantic Indexing is an Optimal Special Case of Multidimensional Scaling", p. 161-167, 15th Annual International SIGIR '92/Denmark-6/92, [online], Jun. 1992 [retrieved on Oct. 8, 2008]. Retrieved from the Internet:<URL: www.cse.ucsd.edu/~rik/papers/sigir92/lsi2.ps>.*

\* cited by examiner

Eigenvalues and eigenvectors of the square sum matrix shown in Table 1

| a,b,c | n | $\lambda_n$ | $\phi_{n1}$ | $\phi_{n2}$ | $\phi_{n3}$ | $\phi_{n4}$ |
|---|---|---|---|---|---|---|
| a = 0 | 1 | 10.00 | 1.00 | 0.00 | 0.00 | 0.00 |
| b = 0 | 2 | 9.00 | 0.00 | 1.00 | 0.00 | 0.00 |
| c = 0 | 3 | 8.00 | 0.00 | 0.00 | 1.00 | 0.00 |
|  | 4 | 7.00 | 0.00 | 0.00 | 0.00 | 1.00 |
| a = 0 | 1 | 10.00 | 1.00 | 0.00 | 0.00 | 0.00 |
| b = 0 | 2 | 9.00 | 0.00 | 1.00 | 0.00 | 0.00 |
| c = 1 | 3 | 8.62 | 0.00 | 0.00 | -0.85 | -0.53 |
|  | 4 | 6.38 | 0.00 | 0.00 | -0.53 | 0.85 |
| a = 0 | 1 | 10.54 | 0.00 | 0.00 | 0.76 | 0.65 |
| b = 0 | 2 | 10.00 | 1.00 | 0.00 | 0.00 | 0.00 |
| c = 3 | 3 | 9.00 | 0.00 | 1.00 | 0.00 | 0.00 |
|  | 4 | 4.46 | 0.00 | 0.00 | -0.65 | 0.76 |
| a = 3 | 1 | 12.54 | -0.76 | -0.65 | 0.00 | 0.00 |
| b = 0 | 2 | 10.54 | 0.00 | 0.00 | 0.76 | 0.65 |
| c = 3 | 3 | 6.46 | -0.65 | 0.76 | 0.00 | 0.00 |
|  | 4 | 4.46 | 0.00 | 0.00 | -0.65 | 0.76 |
| a = 3 | 1 | 12.68 | 0.73 | 0.65 | 0.21 | 0.11 |
| b = 1 | 2 | 10.51 | -0.27 | -0.05 | 0.73 | 0.63 |
| c = 3 | 3 | 6.50 | 0.63 | -0.73 | -0.05 | 0.27 |
|  | 4 | 4.32 | -0.11 | 0.21 | -0.65 | 0.73 |

Fig. 6

METHOD OF VECTOR ANALYSIS FOR A DOCUMENT

TECHNICAL FIELD

The invention relates to a natural language processing including retrieval, classification and summarization of a document, and, more specifically, to a method for representing a document, a method for extracting important parts from an input document and a method for determining similarity between documents.

BACKGROUND OF THE INVENTION

A process of extracting important parts from a document is one of essential processes in a document summarization process. The process of extracting basically comprises giving importance to each sentence of the document quantitatively and extracting sentences having high importance. Conventional techniques of document summarization processing are described in "Automated Text Summarization: A survey" by M. Okumura and E. Nanba, in Journal of National Language Processing, Vol. 6 No. 6, July 1999. This literature enumerates seven features used for evaluating importance, including (1) occurrence frequencies of terms in a document, (2) positional information within the document, (3) document title information and (4) text structure obtained through an analysis of the relation between sentences. In particular, the information of the occurrence frequencies of terms in a document is regarded as a basic feature because content terms that occur frequently in the document tend to indicate the topic of the document. Some specific methods that utilize this information includes a method for giving a weight to each term in accordance with its frequency of occurrence within an input document and define importance of each sentence based on the sum of weights to the terms contained in each sentence, and a method for weighting to each term using information of not only the occurrence frequencies of terms but also the number of the documents containing each term within a set of the documents.

The above-referenced literature describes a dynamic document summarization technique. When presenting a retrieving result to a user, it indicates to the user the important parts of the document related with a user's query as a summarization and helps the user determine quickly and accurately whether the retrieved document matches the query. The above-referenced literature also describes one of the conventional methods, that is, a method for retrieving important sentences reflecting relatedness with a query. In the method, document importance calculated with occurrence frequencies of terms within the document is added to scores obtained based on frequencies with which terms in the query occur within the object document.

A process for determining document similarity is essential to automatic document classification and document retrieval, in particular, similarity based retrieval for retrieving documents that are similar to a user specified document. In the process for determining document similarity, a document is often represented in a vector form. In the following description, a vector that is generated from an entire document is called a document vector, a vector generated from a part of a document is called a document segment vector, and, particularly, a vector generated from a sentence is called a sentence vector. Various methods are well known to define element values of a document vector; for example, a method that compares an occurrence frequency of each term in a concerned document with a predetermined value to give 1 or 0 to each vector element, a method that uses occurrence frequency, and a method that gives a value obtained by multiplying occurrence frequency by logarithm of an inverse of the ratio of the number of the documents in which the corresponding term occurs to the total documents number. Such document representation methods are commonly used in the vector space model.

Such document vectors indicate which terms occur in the document and how often those terms occur in the document. Since it is considered that a document concept is represented by which and how often terms occur in the document, the direction of the obtained document vector can be regarded as representing the document concept. In addition, the occurrence frequency of terms in the document is related to a vector norm. The value of squared norm of the obtained document vector can be regarded as representing the strength or energy of the concerned document.

Similarity measured by cosine between two vectors is often used to determine the similarity between two documents represented by the vectors. This similarity is defined as a value obtained by dividing an inner product of the two vectors by norms of each vectors. Since the direction of the document vector represents a concept as described above, such similarity does not reflect the energy difference between the documents but does reflect only the difference between concepts.

It is objective of the invention to provide a document analysis method for extracting important sentences from a given document and/or determining the similarity of two documents and a method for representing documents suited for the document analysis method.

In extracting important sentences from a document, the sentence having the concept close to a central concept of the concerned document should be given high priority. Accordingly, it is essential to determine the central concept of the document and obtain the relationship of concepts between each sentence and the entire document. However, in the conventional methods where sentence importance is defined by a sum of weights of each term, it is not always clear how degree the sentence importance reflects the central concept of the document. Consequently, longer sentences tend to be extracted as important sentences only for the reason that they are long. In addition, since the conventional methods do not obtain the relationship of the concepts between each sentence and the entire document, it is not ensured that the sentence whose concept is close to the central concept of the concerned document be always extracted.

In extracting sentences that are important and related to a query from a document, a method is often adopted that obtains frequencies that terms in the query occur in the target sentences. In this case, the score will be zero if both the query and a target sentence do not share the same term. In practice, even if no common term is contained in both the query and the target sentence, it is desirable that non-zero relatedness should be obtained if one of a pair of terms co-occurring frequently in the document is included in the query and the other in the target sentence. For example, assume a document containing a paragraph that introduces the relationship between "Tokyo" and "Ginza". When a user issues a query including "Tokyo", it is desirable for the system to be able to present the user sentences including "Ginza" as well as sentences including "Tokyo".

In determining the similarity between two documents, the conventional methods represent a document using a single vector. In such a method, there have been a problem that the concept represented by the vector is ambiguous and a problem that the spread of the concept could not be represented. For example, assume that a, b, c, and d represent certain terms respectively. A document containing combinations of a-b and c-d should be distinguished from another document containing combinations of a-c and b-d because those two documents seem to represent different concepts. However, with the conventional vector representation, vectors of two documents would be same, which means that distinguishing two documents is difficult. Besides, since a document is usually composed of many sentences and each sentence has its own concept, a concept represented by the document has spread. It is difficult, however, to represent such spread of the document concept with a single vector. Thus, since the document concept is not represented precisely in the conventional methods, it has been difficult to obtain the similarity between documents correctly in conventional document retrieval and classification processing.

SUMMARY OF THE INVENTION

In order to solve the above-described problems, according to one aspect of the invention, a method is provided that comprises; detecting terms that occur in an input document; segmenting the input document into document segments, each segment being an appropriately sized chunk; generating document segment vectors, each vector including as its element values according to occurrence frequencies of the terms occurring in the document segments; and representing a set of document segment vectors by eigenvalues and eigenvectors of a square sum matrix of the document segment vectors.

According to another aspect of the invention, important document segments are extracted from an input document. More specifically, a method is provided that comprises; detecting terms that occur in the input document; segmenting the input document into document segments, each segment being an appropriately sized chunk; generating document segment vectors, each vector including as its element values according to occurrence frequencies of the terms occurring in the document segments; calculating eigenvalues and eigenvectors of a square sum matrix; selecting from the eigenvectors a plural of eigenvectors to be used for determining importance; calculating a weighted sum of the squared projections of the respective document segment vectors onto the respective selected eigenvectors; and selecting document segments having significant importance based on the calculated weighted sum of the squared projections of the respective document segment vectors.

According to a further aspect of the invention, a document segment having some relatedness with a query is retrieved from an input document. More specifically, a method is provided that comprises; detecting terms that occur in the input document; segmenting the input document into document segments, each segment being an appropriately sized chunk; generating document segment vectors, each vector including as its element values according to occurrence frequencies of the terms occurring in the respective document segments; calculating eigenvalues and eigenvectors of a square sum matrix of the document segment vectors to determine a subspace; detecting query terms that occur in the query to generate query vectors, each vector including as its element values according to occurrence frequencies of the respective query terms so as to project the query vectors onto the subspace; and projecting each of the document segment vectors onto the subspace to calculate the relatedness of the query with each of the document segments.

According to another aspect of the invention, similarity between given two input documents is determined. More specifically, a method is provided that comprises; detecting terms that occur in each of the input documents; segmenting each of the input document into respective document segments, each segment being an appropriately sized chunk; generating document segment vectors, each vector including as its element values corresponding to occurrence frequencies of the terms occurring in the respective document segments; calculating, for each of the input documents, a squared inner product for all combinations of the document segment vectors contained in the respective input document; and determining the similarity between the two input documents based on a sum of the squared inner products.

In another embodiment of the invention for determining similarity between two input documents, a method is provided that comprises; calculating eigenvalues and eigenvectors of a square sum matrix of document segment vectors for one of the two input documents; selecting, as basis vectors, the eigenvectors corresponding to larger eigenvalues from the calculated eigenvectors, calculating a weighted sum of the squared inner products between the document segment vectors of the other document of the two input documents and each basis vectors; and determining the similarity between the two input documents based on the weighted sum of the squared inner products.

In a further embodiment of the invention for determining similarity between two input documents, a method is provided that comprises; calculating eigenvalues and eigenvectors of a square sum matrix of document segment vectors for each of the two input documents; selecting, as basis vectors, the eigenvectors corresponding to larger eigenvalues from the calculated eigenvectors for each of the two input documents; calculating a weighted sum of the squared inner products for a combination of the selected bases; and determining the similarity between the two input documents based on the weighted sum of the squared inner products.

BRIEF DESCRIPTION OF THE DRAWINGS

FIG. 6 is a table showing examples of eigenvalues and eigenvectors.

DETAILED DESCRIPTION OF THE PREFERED EMBODIMENTS

Representation of Document Segments and Extraction of Important sentences

In one embodiment of the invention, concepts of each sentence consisting an input document as well as central concepts of the document are first defined and then contribution of each sentence to the central concepts of the concerned document is obtained to determine importance of each sentence based on a magnitude of the respective obtained contribution. In this embodiment, a sentence is used as a unit of a document segment. A concept of each sentence can be represented by a sentence vector that contains, as its elements, values to be determined by the information of how frequently the respective terms occur in the sentence. A basis vector is characterized by the property that the sum of the squared projection values of each sentence vector onto the basis vector is larger than that onto any vector other than basis vectors and that the basis vectors are orthogonal each other. Therefore, the central concept of the document can be defined by a subspace formed by a combination of a certain number of such basis vectors. A contribution of each sentence to the central concept of the document can be determined by a weighted sum of the squared projections of each sentence vector onto the subspace.

Relatedness or relevance between a sentence and a query can be determined as follows; each basis vector is weighted based on a squared projection value of the query vector onto each basis vector and then the weighted sum of the squared projections of each sentence vector onto each basis vector is obtained as relatedness or relevance.

In accordance with one embodiment of the invention, importance given to each sentence based on the contribution of each sentence to the central concept of the document makes it easy to precisely extract important sentences from the document. Importance also enables to sort sentences in their importance order and to control a ratio of the length of the extracted sentences relative to the entire document. Besides, the range of the central concept of the document can be modified by changing the number of the dimensions of the subspace, that is, a number of the basis vector to be combined, enabling to control the spread of the concept of the extracted sentences. The less the number of dimensions of the subspace, the narrower spread of the concept.

In calculating relatedness between a sentence and a query, since the method is based on commonality of the concepts between the sentence and the query, non-zero relatedness can be obtained as long as concepts of the sentence and the query are common even though none of same terms appear in the sentence and the query.

Figure 1:
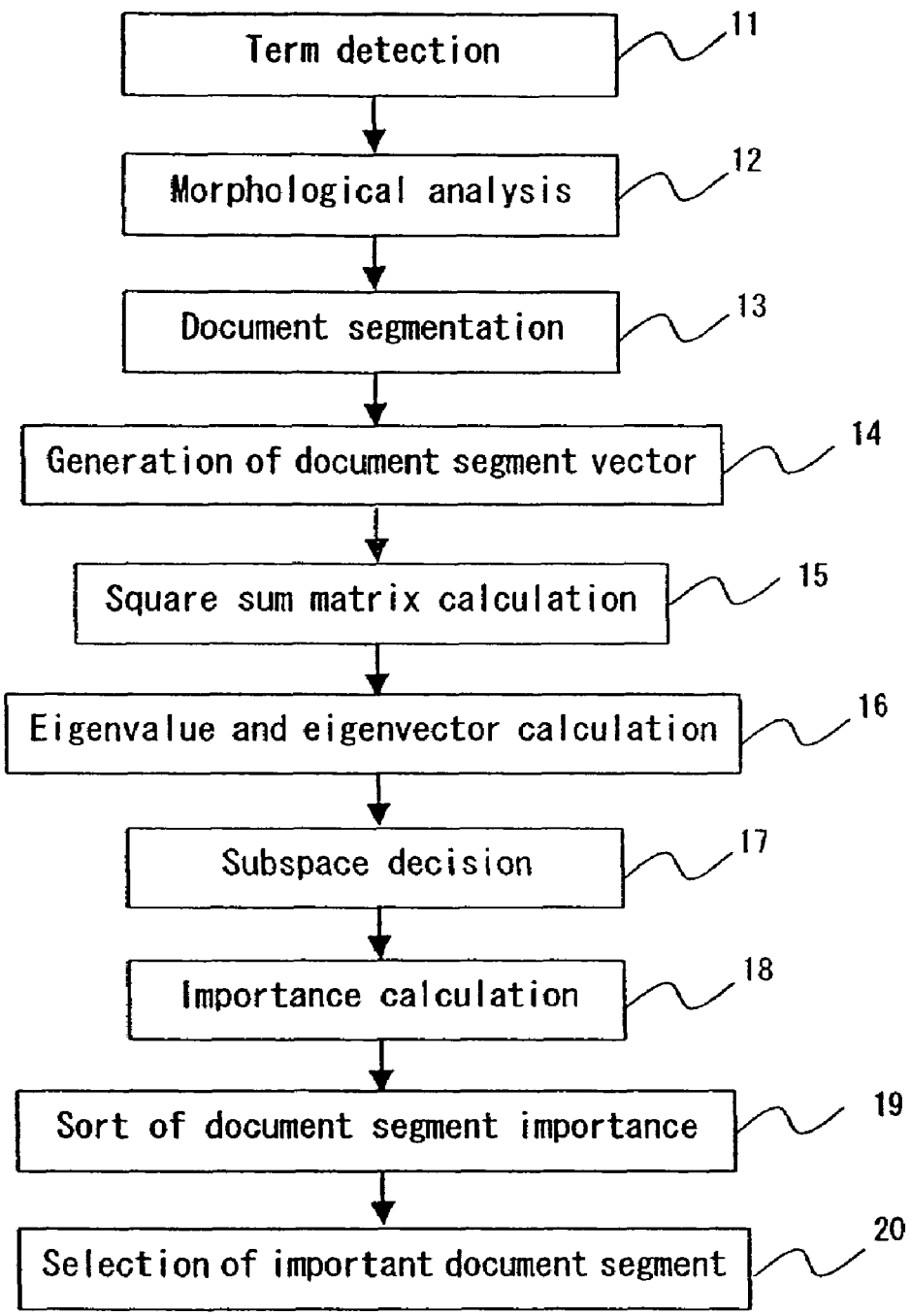
FIG. 1 is a functional block diagram illustrating a system for extracting important sentences from a document in accordance with one embodiment of the invention.

FIG. 1 is a functional block diagram illustrating an overall process of one embodiment of the invention. This embodiment can be implemented by executing programs on a general-purpose computer.

In FIG. 1, there are a term detection block 11, a morphological analysis block 12, a document segmentation block 13, a document segment vector generation block 14, a square sum matrix calculation block 15, an eigenvalue and eigenvector calculation block 16, a subspace decision block 17, an importance calculation block 18, a document segment sorting block 19 and a document segment selection block 20. English documents will be referred to in the following description of this embodiment.

Firstly, the term detection block 11 detects words and symbol sequences such as numerals from an input document. Words and symbol sequences are generally referred to as "terms" herein. In case of English documents, it is easy to detect terms because in the English orthography terms are always written separately with blanks. The morphological analysis block 12 performs a morphological analysis such as assigning a part of speech to each of the terms.

The document segmentation block 13 segments the document into document segments. The most fundamental process of the document segmentation is segmentation from a document to sentences. In case of English documents, it is easy to segment a document into sentences because a sentence usually ends with a period followed by at least one space. Other segmentation methods can be used; for example, several sentences can be combined to form a document segment in such way that all segments should contain the same number of the sentences or a document can be segmented into segments in such way that every segment should contain the same number of terms regardless of any boundary between sentences.

The document segment vector generation block 14 calculates the dimensionality of vectors to be generated from the terms that occur in the entire document and determines correspondences between each vector element and each term. It should be noted that it is not necessary to assign vector elements to all kinds of terms occurring in the document. For example, using a result of the process of assigning parts of speech, it is possible to use only the terms which have been judged as a noun or a verb in the process to generate document segment vector. Then, the document segment vector generation block 14 obtains kinds of the terms occurring in each document segment and occurrence frequencies of each kind of terms, then determines values of corresponding vector elements to generate document segment vectors. Conventional methods are also employed to give a weight to each element value.

Now, assume a document D composed of N sentences, wherein a set of words is given by $\{w_1, \ldots, w_k\}$ and a vector of the n-th sentence in the document D is defined as $d_n = (d_{n1}, \ldots, d_{nk})$, where $d_{nk}$ represents the occurrence frequency or weighted value of the word $w_k$ in the n-th sentence.

The square sum matrix calculation block 15 calculates a square sum matrix of each document segment vector. A square sum matrix $A = (A_{ab})$ is calculated in the following equation:

$$A_{ab} = \sum_{n=1}^{N} d_{na} d_{nb} \tag{1}$$

The eigenvalue and eigenvector calculation block 16 calculates eigenvalues and eigenvectors of the matrix A. The calculated m-dimension eigenvector and eigenvalue are referred to as $\Phi_m$ and $\lambda_m$ respectively. Since $\Phi_m$ is a vector represented by a combination of terms, it can be considered to represent a concept. $\Phi_m$ can be considered to represent an m-th eigenconcept because it is determined uniquely for the input document. $\Phi_1$ represents the most common concept throughout all sentence segments because the sum of the squared projections of all sentence vectors onto $\Phi_1$ is greater than that onto any other vector. Since $\lambda_1$ is the sum of the squared projections itself, it can be considered to represent the strength or energy on the concept that $\Phi_1$ represents. $\Phi_2$ is the axis that gives the largest sum of the squared projections under the constraint that $\Phi_2$ is orthogonal to $\Phi_1$. The same relationship holds for the higher order eigenvectors like $\Phi_3$ and so on.

The eigenvectors obtained as described above are used as basis vectors for a subspace approximating a set of document segment vectors. If L eigenvectors are used, the dimension of the subspace is L, which means that the concept of the input document has been expanded to L eigenconcepts that are orthogonal each other. A subspace can be called a concept subspace. The subspace decision block 17 then decides a value of L specifically. Given that R is a rank of a matrix A, the document would have R concepts since R eigenvectors can be obtained from the matrix A. The subspace represents the central concept using L concepts out of R concepts. The following expression can represent the extent to which the central concept occupies the inherent concept, in other words, the extent to which the subspace represents the concept of the entire document.

$$\sum_{m=1}^{L} \lambda_m \bigg/ \sum_{m=1}^{R} \lambda_m \tag{2}$$

This expression can be used as a guide for actually determining the value of L. Changing the value of L enables to control the spread of the central concept of the document, consequently to control the spread of the concepts of the extracted important document segments.

The importance calculation block 18 calculates a square of the projection value of each document segment vector onto the subspace to obtain importance of the document segment. Let $z_n = (z_{n1}, z_{n2}, \ldots, z_{nL})$ be a vector after the projection of $d_n$, the projection value $z_{nm}$ onto the m-th basis vector can be given by the following equation:

$$z_{nm} = \Phi_m^t d_n \tag{3}$$

A sum of the squared projection values of $d_n$ onto the subspace can be given by the following expression:

$$\sum_{m=1}^{L} z_{nm}^2 \tag{4}$$

The calculated sum of the squared projection values of $d_n$ onto the subspace represents a contribution of each document segment to the central concept of the document. Alternatively, the sum of the squared projection values onto the subspace may be calculated according to the following expression using the energy of the basis vector as a weight:

$$\sum_{m=1}^{L} \lambda_m z_{nm}^2 \tag{5}$$

The document segment sorting block 19 sorts the document segments in descending importance order. The document segment selection block 20 selects higher rank of document segments as important segments and outputs them. Thus, document segments can be extracted according to the descending order of their contribution to the central concept of the document.

Calculation of Relatedness with a Query

Figure 2:
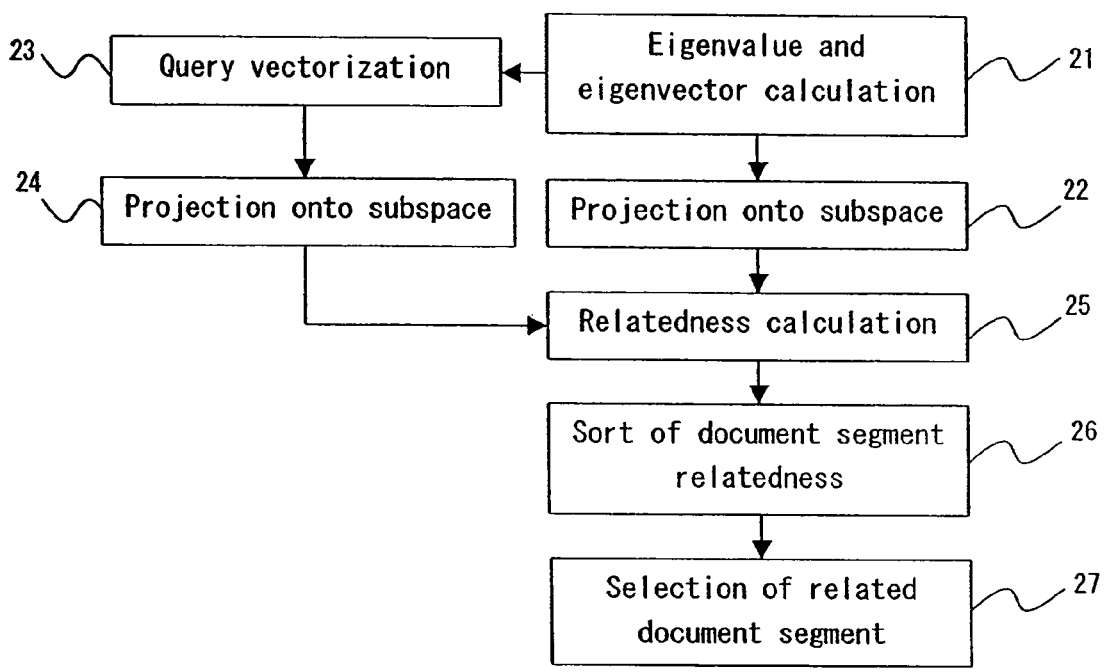
FIG. 2 is a functional block diagram illustrating a system for retrieving document segments having relatedness with a query in accordance with one embodiment of the invention.

FIG. 2 shows a functional block diagram illustrating an overall structure of a system for calculating relatedness between a document segment of the input document and a query and selecting sentences in accordance with one embodiment of the invention. In FIG. 2, there are an eigenvalue and eigenvector calculation block 21, a subspace projection block 22, a query vectorization block 23, another subspace projection block 24, a relatedness calculation block 25, a document segment sorting block 26 and a document segment selection block 27.

English document is used as an example to describe this embodiment. The same processes are performed as in the embodiment shown in FIG. 1 until the eigenvalue and eigenvector are calculated. The subspace projection block 22 projects document segment vectors onto the L-th subspace. Let $z_n$ be the vector after the projection same as in FIG. 1 and its elements are given by expression (5). The query vectorization block 23 performs processes to the query, which are equivalent to the processes of block 11 to block 14 in FIG. 1. Let q be a vector of the query. The subspace projection block 24 determines a vector y by projecting q onto the subspace. The m-th element $y_m$ of the vector y is given by the following equation:

$$y_m = \Phi_m^t q \tag{6}$$

The relatedness calculation block 25 calculates relatedness $g_n$ with the n-th document segment according to the following equation:

$$g_n = y^t z_n / \|q\| \tag{7}$$

The above-calculated $g_n$ has a value that is proportional to the norm of $z_n$. The above equation may be further normalized using the following expression to have no relation with the norm of $z_n$.

$$\|z_n\| \tag{8}$$

The relatedness can be calculated by the equation (7) even when there is no common term in the document segment and the query. The reason is as follows: If there is a pair of terms that often co-occur in document segments within a document, coefficients for those terms have a same sign in lower-order eigenvectors and have different signs in higher-order eigenvectors. In other words, the difference between the terms is reflected in higher-order vectors but not in lower-order vectors. If higher-order eigenvectors reflecting the difference between the terms are not included in the L-dimensional subspace, the equation (7) gives a non-zero value when one of the term pair co-occurring in the document is included in the query and the other in the concerned document segment.

The document segment sorting block 26 sorts the document segments in descending order with respect to the relatedness. The document segment selection block 27 selects higher rank of document segments as segments with high relatedness and outputs them. If document segments are wanted to be selected that are important and related to the query, document segment sorting executes using values obtained by adding the relatedness to the importance obtained through the processes shown in FIG. 1.

Alternatively, the relatedness may be calculated as follows. First, a weight $s_m$ for the m-th eigenvector is defined as following equation.

$$s_m = (\Phi_m^t q)^2 / \|q\|^2 \tag{9}$$

where $s_m$ represents a ratio of the query energy in the m-th eigenvector direction relative to the total energy of the query. The relatedness $g_n$ of the query to the document segment n may be defined as follows:

$$g_n = \sum_{m=1}^{L} s_m (\phi_m^t d_n)^2 \tag{10}$$

As seen, $g_n$ is defined as a weighted sum of the document segment energy in the $\Phi_m$ direction using $s_m$ as a weight. Accordingly, the sentence which has large projection value onto eigenvectors with large weight tends to have a higher relatedness. It is possible to normalize $g_n$ using the following expression to have no relation to the energy of the document segment n.

$$\|d_n\|^2 \quad (11)$$

Similarity Determination

In another embodiment of the invention, two documents are segmented into document segments on an appropriate size basis, e.g. sentences, then vectors to each document segment are calculated and finally a sum of squared inner products for all combinations of the document segment vectors of the both documents are calculated to determine similarity between the documents.

In case of long documents, since the number of terms occurring in the document is increased, dimensions of document segment vectors would be large and the number of resulting document segment vectors would be increased. Therefore, calculating inner products for all combinations of the document segment vectors would impose a heavy load with respect to the processing time and required memory. So, in this embodiment either or both of the two documents are represented by the concept subspace in the same manner as the important sentence extraction described above.

Similarity between the two documents that one document is represented by document segment vectors and the other by the concept subspace, is calculated by a weighted sum of the inner products for all combinations of the document segment vectors and the basis vectors. When both documents are represented by the concept subspaces, the document similarity is obtained by calculating a weighted sum of the inner products for all combinations of the basis vectors of the documents.

In this embodiment, a document is represented by either a set of document segment vectors or a subspace. This means that the concept of the document is represented by a set of the concepts of document segments, and accordingly the document concept can be represented more precisely than when a document is represented by a single vector. The spread of the document concept can be also reflected onto the similarity because the concepts of all document segments of both documents are reflected on the similarity.

Although the subspace approximates the set of document segment vectors, it is known that an error becomes minimum if a set of eigenvectors of the square sum matrix of the document segment vectors is used as the basis vectors. Therefore, the similarity obtained from all combinations of the document segment vectors of one document with the selected basis vectors of the other document can best approximate the similarity obtained from all combinations of the document segment vectors of the two documents. As described before, the subspace in this case represents the central concept of the document. So, the document similarity obtained from all combinations of the document segment vectors of one document with the selected basis vector of the other document is equivalent to the similarity obtained from the common concept between the concepts of one document and the central concept of the other document.

When both documents are represented by concept subspaces, the obtained similarity also approximates the document similarity obtained from all possible combinations of the document segment vectors of the two documents. In this case, the similarity is obtained based on the common concept of all combinations of central concepts of both documents. Therefore, when either or both of two documents are represented by the concept subspace, the obtained similarity will be the best approximation of the similarity based all combinations of document segment vectors. In addition, the spread of the document concept is naturally reflected on the similarity since the concepts of all document segments of both documents are approximately reflected on the similarity.

Figure 3:
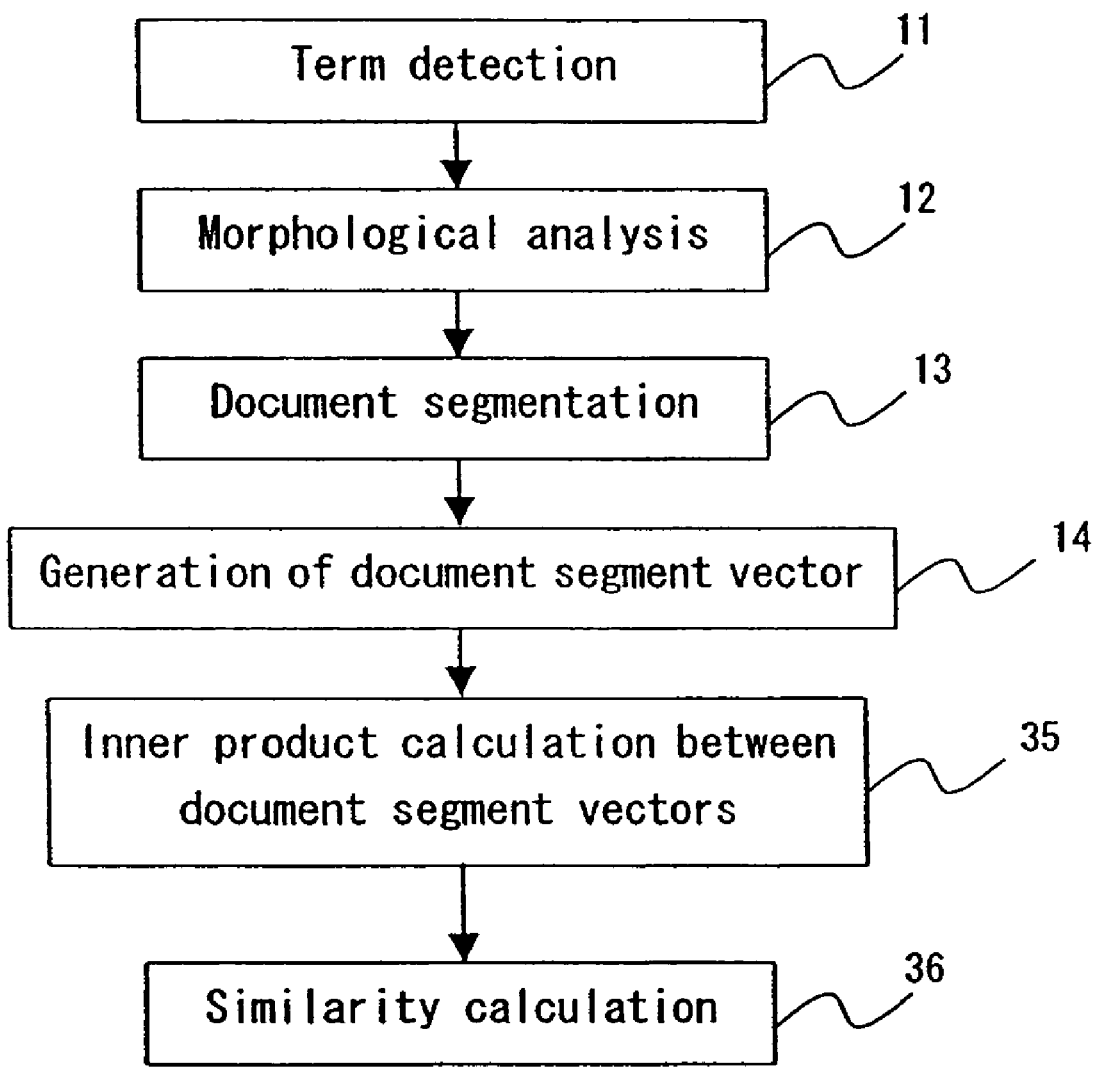
FIG. 3 is a functional block diagram illustrating a system for determining similarity between two documents in accordance with one embodiment of the invention.

FIG. 3 shows a functional block diagram illustrating a system for comparing document segment vectors to obtain the document similarity in accordance with one embodiment of the invention. This embodiment can be implemented by executing programs on a general-purpose computer. FIG. 3 shows a functional block diagram of the system configured with a general-purpose computer and programs.

There are a term detection block 11, a morphological analysis block 12, a document segmentation block 13, a document segment vector generation block 14, an inner product calculation block 35 and a similarity calculation block 36. Blocks 11 through 14 are the same blocks as shown in FIG. 1. English documents are used as examples to describe this embodiment.

Two input documents are processed in the term detection block 11 through the document segment vector generation block 14 described above with reference to FIG. 1, to generate document segment vectors.

The inner product calculation block 35 calculates inner product values for all combinations of the document segment vectors of two input documents and holds those values. Here assume S and T are input documents. Assume that k terms occur within the documents S, T, and n-th document segment vector $s_n$ (n=1, ... N) of the document S is represented by $(S_{n1}, S_{n2}, \ldots, S_{nk})$ and the m-th document segment vector $t_m$ (m=1, ... M) of the document T by $(t_{m1}, t_{m2}, \ldots, t_{mk})$. Then the value of the inner product between the document segment $s_n$ and $t_m$ is represented by the following equation:

$$s_n^t t_m = \sum_{k=1}^{K} s_{nk} t_{mk} \quad (12)$$

where the superscript t represents transpose.

The similarity calculation block 36 calculates a sum of the squared inner products for all combination of the document segment vectors and determines the similarity between the two documents. The similarity r is given by the following equation:

$$r = \left\{ \sum_{n=1}^{N} \sum_{m=1}^{M} (s_n^t t_m)^2 \bigg/ \sqrt{\sum_{n=1}^{N} \sum_{m=1}^{N} (s_n^t s_m)^2 \sum_{n=1}^{M} \sum_{m=1}^{M} (t_n^t t_m)^2} \right\}^{1/2} \quad (13)$$

The similarity would be zero when there is no common term in the documents S and T, whereas it would be 1.0 when both documents are completely identical.

Figure 4:
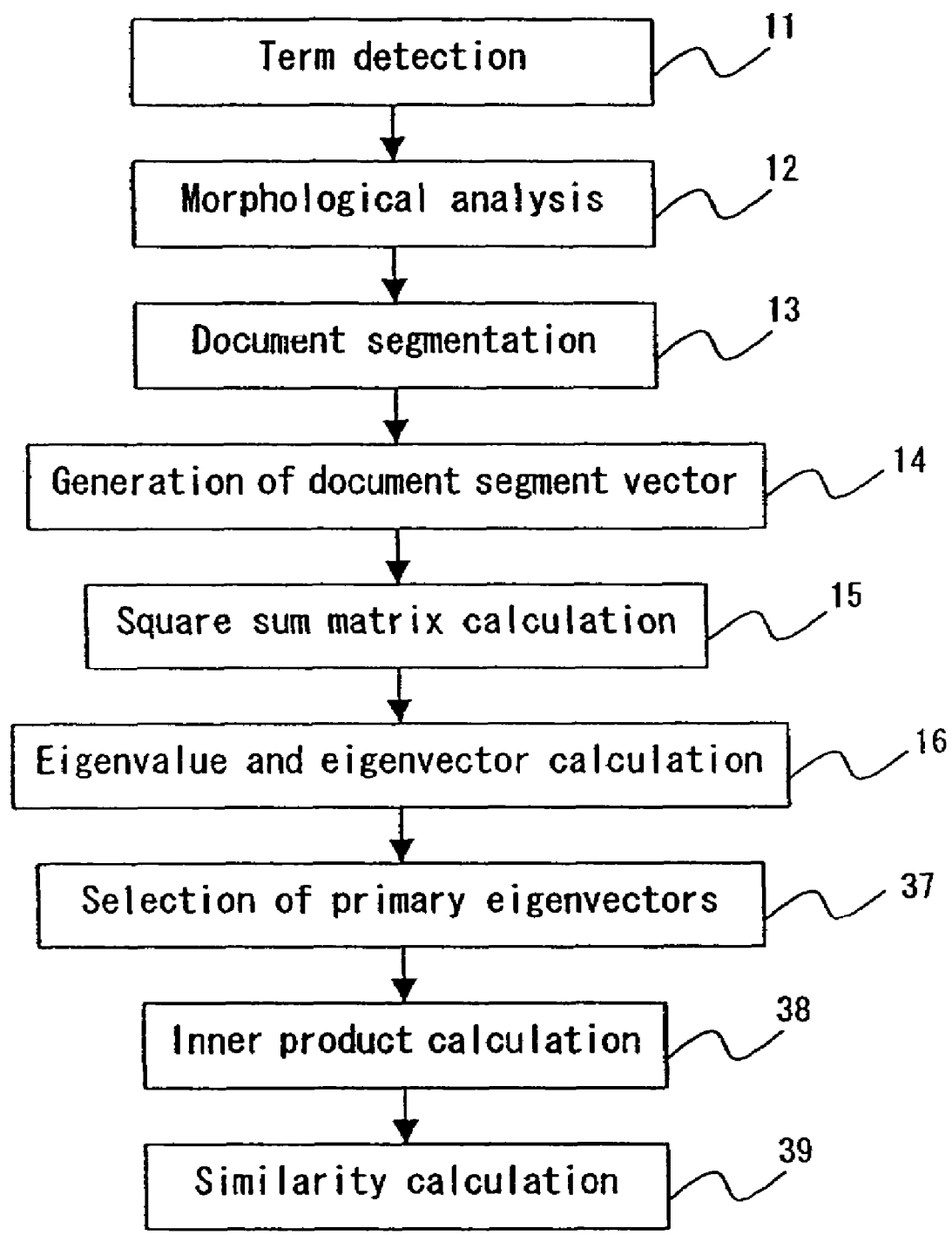
FIG. 4 is a functional block diagram illustrating another system for determining similarity between two documents in accordance with another embodiment of the invention.

FIG. 4 shows a functional block diagram illustrating a system for calculating the similarity by comparing document segment vectors with the basis vectors or comparing basis vectors in accordance with one embodiment of the invention. A term detection block 11 through an eigenvalue and eigenvector calculation block 16 are the same blocks as shown in FIG. 1. Additionally there are a primary eigenvector selection block 37, an inner product calculation block 38 and a similarity calculation block 39.

The similarity between the input documents S, T (using the same assumption as in the previous embodiment) is calculated by comparing the document segment vectors of the document T with the basis vectors of the document S. The document S and T are processed in the term detection block 11 through the document segment vector generation block 14 to generate the document segment vector respectively. Then, the square sum matrix calculation block 15 calculates a square sum matrix of each document segment vector for the document S. A square sum matrix $A=(A_{ab})$ is calculated by the following equation:

$$A_{ab} = \sum_{n=1}^{N} s_{na} s_{nb} \quad (14)$$

The inner product calculation block 38 calculates inner product values between the eigenvector $\Phi_n$ of the document S and the document segment vector $t_m$ of the document T for all combinations of n and m. The similarity calculation block 39 uses eigenvalue of each order as a weight to calculate the similarity from the above-calculated inner product values according to the following equation:

$$r = \left\{ \sum_{n=1}^{L} \sum_{m=1}^{M} \lambda_n (\phi_n^t t_m)^2 \bigg/ \sqrt{\sum_{n=1}^{L} \lambda_n^2 \sum_{n=1}^{M} \sum_{m=1}^{M} (t_n^t t_m)^2} \right\}^{1/2} \quad (15)$$

Although the similarity in accordance with equation (15) is calculated from the weighted sum of the squared inner products, alternatively it is possible to obtain the similarity between the document segments of the document T and the document S for each of the document segments of the document T, and then to calculate their average, which is regarded as similarity between the documents T and S. In this case, the similarity is given by the following equation:

$$r = \left\{ \sum_{m=1}^{M} \sum_{n=1}^{L} \lambda_n (\phi_n^t t_m)^2 \bigg/ \left( \sqrt{\sum_{n=1}^{L} \lambda_n^2} \|t_m\|^2 M \right) \right\}^{1/2} \quad (16)$$

In another embodiment, the similarity between two documents S and T is obtained by matching the basis vectors of each document. In this embodiment, the eigenvalues and eigenvectors are calculated for the document S as well as the document T by the processes in the square sum matrix calculation block 15 and the eigenvalue and eigenvector calculation block 16, and then the primary eigenvectors are selected as the basis vectors in the primary eigenvector selection block 37. Let $\gamma_n$, $\tau_n$ be the n-th eigenvalue and eigenvector of the square sum matrix of document T, respectively. Suppose J eigenvectors are selected as the basis vectors. The inner product calculation block 38 calculates inner product values between the eigenvector $\Phi_n$ of the document S and the eigenvector $\tau_m$ of the document T for all combinations of n and m and holds those values. Then, the similarity calculation block 29 calculates the similarity according to the following equation:

$$r = \left\{ \sum_{n=1}^{L} \sum_{m=1}^{J} \lambda_n \gamma_m (\phi_n^t \tau_m)^2 \bigg/ \sqrt{\sum_{n=1}^{L} \lambda_n^2 \sum_{m=1}^{J} \gamma_m^2} \right\}^{1/2} \quad (17)$$

It is clear that equations (15) and (16) are approximation of the similarity (given by equation (13)) based on all combinations of the document segments as described above with reference to FIG. 3, because the numerator of equation (13) can be converted as the following equations (18) and (19).

$$\sum_{n=1}^{N} \sum_{m=1}^{M} (s_n^t t_m)^2 = \sum_{n=1}^{N} \sum_{m=1}^{M} t_m^t s_n s_n^t t_m \quad (18)$$

$$= \sum_{m=1}^{M} t_m^t A t_m$$

$$= \sum_{m=1}^{M} t_m^t \left( \sum_{n=1}^{R} \lambda_n \phi_n \phi_n^t \right) t_m$$

$$= \sum_{m=1}^{M} \sum_{n=1}^{R} \lambda_n (\phi_n^t t_m)^2$$

$$\sum_{n=1}^{N} \sum_{m=1}^{M} (s_n^t t_m)^2 = \sum_{m=1}^{M} \sum_{n=1}^{R} \lambda_n (\phi_n^t t_m)^2 \quad (19)$$

$$= \sum_{n=1}^{R} \lambda_n \phi_n^t \left( \sum_{m=1}^{M} t_m t_m^t \right) \phi_n$$

$$= \sum_{n=1}^{R} \lambda_n \phi_n^t B \phi_n$$

$$= \sum_{n=1}^{R} \sum_{m=1}^{Q} \lambda_n \gamma_m (\phi_n^t \tau_m)^2$$

where B is the square sum matrix of the document T and Q is its rank. The following relation is used in the above equations.

$$A = \left( \sum_{n=1}^{R} \lambda_n \phi_n \phi_n^t \right) \quad (20)$$

In equation (18), it will be same as the numerator in equation (15) if L eigenvectors are used for document S. In equation (19), it will be same as the numerator in equation (17) if J eigenvectors are used for document T.

To determine the similarity, a user can select which combination should be used, between the respective document segment vectors, between the document segment vectors and the basis vectors, or between the basis vectors. However, as far as long documents are concerned, the basis vector combination is preferable because it requires less memory size and less processing time. In the above-described embodiments, some processes may be performed beforehand except for the calculations of the last inner product and the similarity.

Observation of Eigenvalues and Eigenvectors

Now, through a simple simulation, it will be described how eigenvalues and eigenvectors are obtained for a given term co-occurrence. Suppose that terms 1, 2, 3 and 4 occur in a document and a square sum matrix is obtained as shown in Table 1.

TABLE 1

$$\begin{bmatrix} 10 & a & 0 & 0 \\ a & 9 & b & 0 \\ 0 & b & 8 & c \\ 0 & 0 & c & 7 \end{bmatrix}$$

Each of the diagonal elements represents term energy given by the following equation (21). The energy of the term 1 is the largest. Parameters a, b and c give the degree of co-occurrence between terms. Parameter a gives the degree of co-occurrence between terms 1 and 2, b gives between terms 2 and 3, and c gives between terms 3 and 4. Assume that document segments are given as sentences.

The sentence energy is considered as being given by the squared norm of the sentence vector. The energy of the n-th sentence, $E(d_n)$, is then defined in the following equation:

$$E(d_n) = \sum_{k=1}^{K} \|f_{nk}\|^2 \quad (21)$$

Similarly, the energy of the term $w_k$, $E(w_k)$, is defined in the following equation:

$$E(w_k) = \sum_{n=1}^{N} \|f_{nk}\|^2 \quad (22)$$

Let E(D) be the total energy of the document D. The following equation stands. This equation shows that the document energy is equal to the sum of all sentence energies or all term energies.

$$E(D) = \sum_{n=1}^{N} E(d_n) = \sum_{k=1}^{K} E(w_k) \quad (23)$$

FIG. 6 shows eigenvalues and eigenvectors obtained from the squared sum matrix when certain values are given to the parameters a, b and c. FIG. 6 shows eigenvalues $\lambda_n$, and coefficients $\Phi_{n1}$, $\Phi_{n2}$, $\Phi_{n3}$, $\Phi_{n4}$ for each term in the n-th eigenvector. Hereinafter a virtual sentence of which concept is in the direction of the n-th eigenvector and of which energy is given by the n-th eigenvalue is called the n-th eigensentence.

(1) In the case of a=b=c=0

This case means that the four terms do not co-occur. In FIG. 6, the coefficient of term n in the n-th eigenvector is 1 and those of other terms are 0. This indicates that each eigenvector is each term axis itself. In other words, the concept of the eigensentence is the concept of each term itself. Each eigenvalue is equal to a value of the corresponding diagonal element of the square sum matrix. That is, the energy of each eigensentence is equal to the energy of each term and dependent on the occurrence frequency of each term.

(2) In the case of a=b=0 and c=1

This case means term co-occurrence exists only between terms 3 and 4. Consequently, the concepts of both the 3-rd and 4-th eigensentences are dependent on both term 3 and term 4. Term co-occurrence could not be represented with the conventional vector space model but it is naturally reflected onto the eigensentence concept in accordance with the invention. The energy of the 3rd eigensentence is larger than that in the case of a=b=c=0.

(3) In the case of a=b=0 and c=3

It is observed that $\Phi_{13}$ and $\Phi_{14}$ in the 1-st eigenvector have non-zero values and that the energy of the eigensentence whose concept are determined by both terms 3 and 4 is the largest. This indicates that the energy of the eigensentence is dependent on both the occurrence frequencies of terms and the co-occurrence frequencies between terms.

(4) In the case of a=3, b=0 and c=3

Terms co-occur between term 1 and 2, and between terms 3 and 4, and do not co-occur between terms 1,2 and 3,4. As a result, the matrix S is divided into submatrices. In such case, eigensentence concepts are determined by the combination of term 1 with 2 or the combination of term 3 with 4.

(5) In the case of a=3, b=1 and c=3

When term co-occurrence takes place between term 2 and 3, the concepts of the eigensentences are dependent on all of the terms. Term 1 does not co-occur with term 3 or term 4. Therefore, term 1 is regarded to have an indirect co-occurrence relationship with term 3 or term 4 through a direct co-occurrence relationship between term 2 and 3, or between 3 and 4. However, it is understood that such indirect co-occurrence relation affects the concepts of the eignsentences. In actual documents, a chain of indirect co-occurrences between terms as well as the direct term co-occurrence seems to play an important role to form document concepts.

Figure 5:
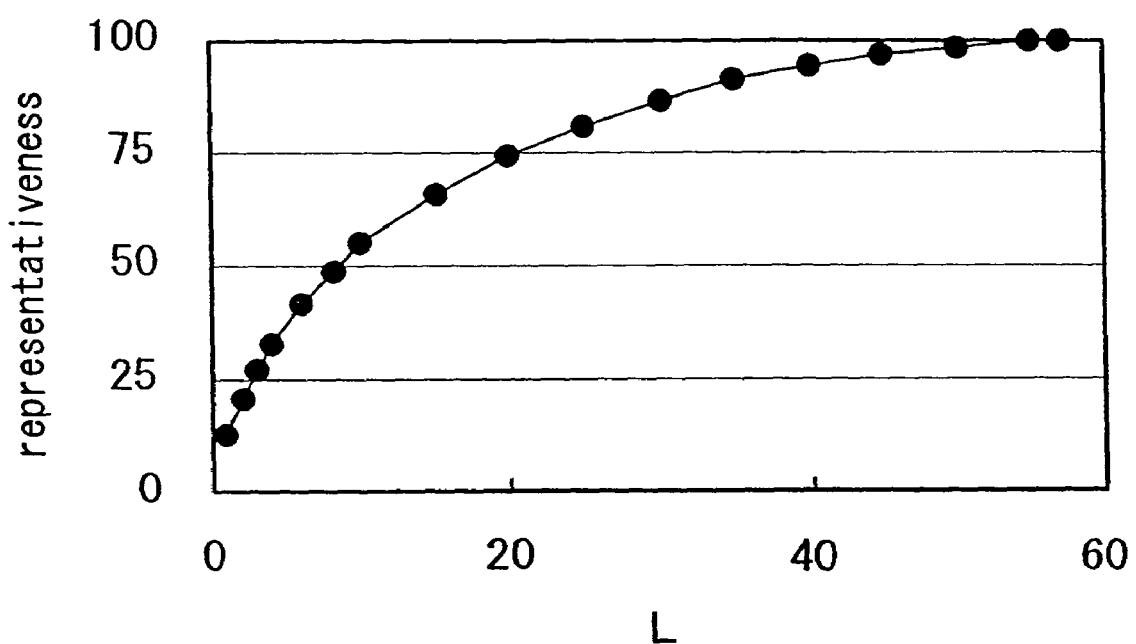
FIG. 5 is a graphical chart showing the relationship between the dimension L and the representativeness of a concept subspace when nouns are extracted from a news article, composed of 58 sentences and 1100 words, to generate a sentence vector of 146 dimensions.

FIG. 5 shows the relationship between the dimension L of a concept subspace and its representativeness for a document, an English newspaper article composed of 58 sentences and 1100 terms. The nouns were extracted from the document as terms, and 58 vectors of 146 dimensions were constructed. In this case, the rank of the square sum matrix is 58, so the maximum value of L is 58. The representativeness of the concept subspace can be defined by equation (2). Referring to FIG. 5, the least dimensionality reaching 50% of the representativeness is 8 and the least dimensionality reaching 75% is 20. It implies that significant dimensional reduction is possible. It is also observed that the representativeness of the average sentence vector (namely, the ratio of the sum of the squared projection value of each sentence onto the average vector to the document energy) is 10.4%, which is less than representativeness of the 1st eigensentence, i.e., 12.2%. This means that the 1st eigensentence has a representativeness exceeding the average vector. The representativeness of the 1st eigensentence tends to decrease as the document becomes longer.

The invention advantageously provides a document representation method, which is suitable for a document analysis including extraction of important sentences from a given document and/or determination of similarity between two documents.

In accordance with one embodiment of the invention, the result of the extraction of important sentences can be close to a human sense since the extraction process is performed employing term co-occurrence. In addition, when retrieving sentences having relatedness with a query, sentences having conceptual relatedness can be retrieved based on co-occurrence relation of terms even though there is no common term in the sentences and the query.

In accordance with another embodiment of the invention, highly reliable similarity can be obtained since the similarity between two documents is obtained from all combinations of document segments and the concepts of all document segments are reflected onto the similarity.

Figure 7:
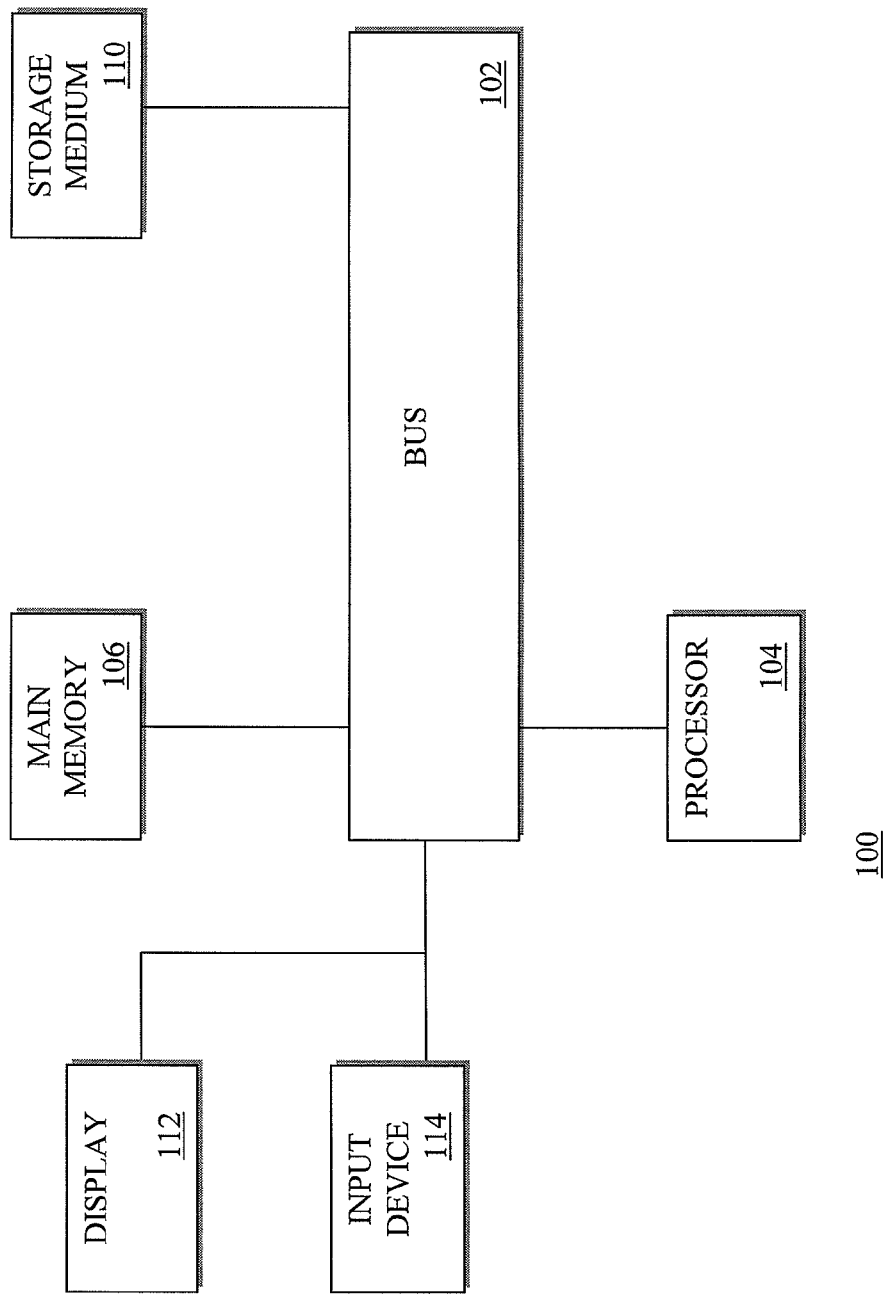
FIG. 7 is a block diagram showing a general purpose computer for executing programs in accordance with embodiments of the present invention.

FIG. 7 is a block diagram showing a general purpose computer 100 for executing programs in accordance with embodiments of the present invention. The computer 100 includes a bus 102 and coupled thereto: a processor 104 for processing information, a main memory 106 and a storage medium 110 for storing information and instructions to be pressed by the processor 104, a display 112 for displaying information to a computer user, and an input device 114 for communicating information and command selections to the processor 104.

Although the invention has been described with reference to the specific embodiments, it is not intended to be limited to those embodiments.

What is claimed is:

1. A computer-implemented method for extracting important document segments from an input document, comprising:

detecting k terms that occur in said input document;

segmenting said input document into N document segments, each segment being a predetermined part of said document;

generating document segment vectors, each vector including as its element values occurrence of frequencies of said terms occurring in said document segments, wherein a n-th document vector $d_n$ (n=1, ..., N) is represented by $(d_{n1}, d_{n2}, \ldots, d_{nk})$ and $d_{ni}$ represents the occurrence frequency of an i-th term among a total k terms in a n-th document segment;

determining eigenvalues and eigenvectors of a square sum matrix A, where said square sum matrix A is a k×k matrix, k>1, and each component $A_{ab}$ of said square sum matrix A indicates a degree of co-occurrence of a-th and b-th terms (a,b=1, ..., k) in said input document and is calculated by:

$$A_{ab} = \sum_{n=1}^{N} d_{na} d_{nb},$$

and a rank of said square sum matrix is represented by R;

selecting, from said eigenvectors, a plural of (L) eigenvectors to be used for determining importance;

calculating a weighted sum of squared projections of said document segment vectors onto the selected eigenvectors; and selecting documents having significant importance based on said calculated weighted sum of square projections of the document segment vectors;

wherein the vector $d_n$ after the projection is represented by $z_n = (z_{n1}, z_{n2}, \ldots z_{nL})$, a projection value of $d_n$ to a $m^{-th}$ eigenvector is given by $z_{nm} = \phi_m{}^t d_n$, where $\phi_m$ represents the $m^{-th}$ eigenvector and t represents transpose;

a sum of squared projections onto a L dimensional subspace being given by:

$$\Sigma_m{}^L = I Z_{nm}{}^2$$

or $$\Sigma_m{}^L = I \lambda_m{}^z nm^2,$$

where $\lambda_m$ represents the eigenvalue of the $m^{-th}$ eigenvector".

2. A method as claimed in claim 1, wherein a value of said L being determined based on a ratio of the central concept to an overall concept of said input document, which is given by:

$$\sum_{m=1}^{L} \lambda_m \Big/ \sum_{m=1}^{R} \lambda_m.$$

3. A system for extracting sentences from a document, said system comprising a storage medium and a processor for executing the steps comprising:

detecting k terms that occur in said input document;

segmenting said input document into N document segments, each segment being a predetermined part of said document;

generating document segment vectors, each vector including as its element values occurrence of frequencies of said terms occurring in said document segments, wherein a n-th document vector $d_n$ (n=1, ..., N) is represented by $(d_{n1}, d_{n2}, \ldots, d_{nk})$ and $d_{ni}$ represents the occurrence frequency of an i-th term among a total k terms in a n-th document segment;

determining eigenvalues and eigenvectors of a square sum matrix A, where said square sum matrix A is a k×k matrix, k>1, and each component $A_{ab}$ of said square sum matrix A indicates a degree of co-occurrence of a-th and b-th terms (a,b=1, ..., k) in said input document and is calculated by:

$$A_{ab} = \sum_{n=1}^{N} d_{na} d_{nb},$$

and a rank of said square sum matrix is represented by R;

selecting, from said eigenvectors, a plural of (L) eigenvectors to be used for determining importance;

calculating a weighted sum of squared projections of said document segment vectors onto the selected eigenvectors; and selecting documents having significant importance based on said calculated weighted sum of square projections of the document segment vectors;

wherein the vector $d_n$ after the projection is represented by $z_n = (z_{n1}, z_{n2}, \ldots z_{nL})$, a projection value of $d_n$ to a $m^{-th}$ eigenvector is given by $z_{nm=\phi m}{}^t d_n$, where $100_m$ represents the $m^{-th}$ eigenvector and t represents transpose;

a sum of squared projections onto a L dimensional subspace being given by:

$$\Sigma_m{}^L = I Z_{nm}{}^2$$

or $$\Sigma_m{}^L = I \lambda_m{}^z nm^2$$

where $\lambda_m$ represents the eigenvalue of the $m^{-th}$ eigenvector.

\* \* \* \* \*